United States Patent
Suemasu et al.

(10) Patent No.: US 9,266,502 B2
(45) Date of Patent: Feb. 23, 2016

(54) STEERING APPARATUS

(71) Applicant: NSK Ltd., Tokyo (JP)

(72) Inventors: Yusuke Suemasu, Takasaki (JP); Masaya Jouta, Takasaki (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/411,512

(22) PCT Filed: Nov. 15, 2013

(86) PCT No.: PCT/JP2013/080899
§ 371 (c)(1),
(2) Date: Dec. 28, 2014

(87) PCT Pub. No.: WO2014/080845
PCT Pub. Date: May 30, 2014

(65) Prior Publication Data
US 2015/0166008 A1    Jun. 18, 2015

(30) Foreign Application Priority Data

Nov. 26, 2012  (JP) .................................. 2012-257559
Feb. 5, 2013   (JP) .................................. 2013-020482
Jun. 26, 2013  (JP) .................................. 2013-133362

(51) Int. Cl.
*B60R 25/021* (2013.01)
*B60R 25/023* (2013.01)

(52) U.S. Cl.
CPC ............ *B60R 25/023* (2013.01); *B60R 25/021* (2013.01); *B60R 25/02105* (2013.01)

(58) Field of Classification Search
CPC ............ B60R 25/023; B60R 25/02105; B60R 25/021
See application file for complete search history.

(56) References Cited

U.S. PATENT DOCUMENTS

| | | | | |
|---|---|---|---|---|
| 2,349,297 | A | * | 5/1944 | Neracher et al. ............. 74/346 |
| 2,874,790 | A | * | 2/1959 | Hennessey ................... 180/6.2 |
| 4,854,141 | A | * | 8/1989 | Haldric et al. ................ 70/182 |
| 5,193,848 | A | * | 3/1993 | Faulstroh .................... 280/775 |
| 5,205,790 | A | * | 4/1993 | Barnabe et al. .............. 464/162 |
| 5,730,010 | A | * | 3/1998 | Norimatsu et al. ............ 70/186 |
| 5,878,832 | A | * | 3/1999 | Olgren et al. ................ 180/444 |
| 5,983,695 | A | * | 11/1999 | Lutz ......................... 72/370.19 |

(Continued)

FOREIGN PATENT DOCUMENTS

| | | |
|---|---|---|
| EP | 1 607 290 A1 | 12/2005 |
| EP | 2 168 821 A1 | 3/2010 |

(Continued)

*Primary Examiner* — Paul N Dickson
*Assistant Examiner* — Timothy Wilhelm
(74) *Attorney, Agent, or Firm* — Shapiro, Gabor and Rosenberger, PLLC

(57) ABSTRACT

A steering apparatus includes a key lock collar (5) fitted on a steering shaft (2) and restricted from rotating by a steering lock mechanism when performing a steering lock, and a cylindrical slip ring (7) interposed between the steering shaft (2) and the key lock collar (5) in radial directions. The slip ring (7) includes a plurality of protruded portions (8) protruding outwardly or inwardly in the radial directions and being provided in a circumferential direction, and an axis-directional portion of the steering shaft (2) covered by the slip ring (7) is formed with a large-diameter portion (10a) and a small-diameter portion (10b), thereby further stabilizing slip torque of the key lock collar (5) and enlarging a range of a dimensional allowance.

12 Claims, 17 Drawing Sheets

(56) References Cited

U.S. PATENT DOCUMENTS

| | | | | |
|---|---|---|---|---|
| 6,094,951 | A * | 8/2000 | Cusati | 70/189 |
| 6,189,919 | B1 * | 2/2001 | Sinnhuber et al. | 280/731 |
| 6,328,315 | B1 * | 12/2001 | Hebenstreit | 277/634 |
| 6,343,993 | B1 * | 2/2002 | Duval et al. | 464/167 |
| 7,048,305 | B2 * | 5/2006 | Muller | 280/775 |
| 7,562,548 | B1 * | 7/2009 | Cymbal et al. | 70/186 |
| 2007/0235246 | A1 * | 10/2007 | Kawaike et al. | 180/443 |
| 2010/0077808 | A1 * | 4/2010 | Maeda et al. | 70/187 |

FOREIGN PATENT DOCUMENTS

| | | | |
|---|---|---|---|
| JP | 52-19839 | U | 2/1977 |
| JP | 59-79446 | U | 5/1984 |
| JP | 07-291095 | A | 11/1995 |
| JP | 2005-351457 | A | 12/2005 |
| JP | 2007203771 | A * | 8/2007 |
| JP | 2010-105653 | A | 5/2010 |
| JP | 2010-163115 | A | 7/2010 |

* cited by examiner

STEERING APPARATUS

TECHNICAL FIELD

The present invention relates to a steering apparatus mounted on a vehicle etc.

BACKGROUND ART

There has hitherto existed a steering apparatus equipped with a steering lock mechanism that restricts a rotation of a steering wheel in order to prevent the vehicle etc from being stolen. The steering lock mechanism is configured to include a key lock collar fitted on a steering shaft and a steering lock device fitted to a column provided on an external side thereof, in which a lock bar provided on the steering lock apparatus is fitted into a groove or the like formed in the key lock collar, thereby disabling the steering wheel from being steered when the vehicle is to be stolen by restricting a rotation of the shaft.

In a conventional steering lock mechanism, it happened that if the steering wheel is rotated by strong force in a steering locked state, the steering lock mechanism was broken, and a lock function was damaged.

Such being the case, there exists a steering lock mechanism configured to rotate the key lock collar about the steering shaft when a predetermined or larger degree of force is applied so as to prevent a breakage, and to give a proper friction to such an extent as to disable the steering wheel from being steered, thereby preventing the vehicle from being stolen.

This type of steering lock mechanism is requested to be compatible with both of stabilizing a slip characteristic between an outer peripheral surface of the steering shaft and an inner peripheral surface of the key lock collar and setting a slip load to such a degree that the steering lock mechanism is not broken. Hence, there is a configuration for acquiring a predetermined magnitude of stable slip torque (frictional force) by forming a non-contact portion between the outer peripheral surface of the steering shaft and the inner peripheral surface of the key lock collar (refer to, e.g., Japanese Patent Application Laid-Open Publication No. 2010-163115).

Further, there is a configuration contrived not to cause an excessive frictional resistance by machining a grease groove in the steering shaft, retaining grease in this grease groove, and supplying the grease to a frictional surface between the key lock collar and the steering shaft (refer to, e.g., Japanese Patent Application Laid-Open Publication No.H07-291095).

Moreover, there is a configuration for the purpose of protecting the steering lock mechanism, in which a slip ring is attached to a fitting portion between the key lock collar and the steering shaft (refer to, e.g., Japanese Patent Application Laid-Open Publication No. 2005-351457).

SUMMARY OF THE INVENTION

Problems to be Solved by the Invention

As described above, in the case of the configuration of forming the non-contact portion between the steering shaft and the key lock collar and the configuration using the grease, though a management load on dimensional accuracy is reduced, the key lock collar needs to be press-fitted in the steering shaft, and hence this portion is to be managed strictly to some extent in terms of dimensional accuracy, resulting in a problem that a machining cost rises corresponding to this strict management.

Moreover, in the case of attaching the slip ring to the fitting portion between the steering shaft and the key lock collar, the slip torque (the torque at which the slip ring starts slipping) of the slip ring is determined by the spring force of the slip ring and a fastening margin based on a gap between the shaft and the collar, however, the slip ring has a high spring constant because of its being a plate spring and is sensitive to a change in fastening margin. Accordingly, the dimensional accuracy of the portion attached with the slip ring is to be strictly managed, and further, if sensitive to the change in fastening margin, there increases an influence caused by a residual stress of the slip ring, resulting in such a problem that the machining cost rises due to process that setting and annealing are to be applied to the slip ring and so on.

It is an object of the present invention, which was devised by putting a focus on the problems described above, to provide a steering apparatus configured to further stabilize slip torque of a key lock collar and enlarge a range of dimensional allowance.

Means for Solving the Problems

According to the present invention in order to solve the problems described above, a steering apparatus is provided, which includes: a key lock collar being fitted on a steering shaft and restricted from rotating by a steering lock mechanism when performing a steering lock; and a cylindrical slip ring being interposed between the steering shaft and the key lock collar in radial directions, in which the steering shaft takes a shape to reduce a change in load against displacement (a quantity of deformation in the radial directions). This configuration enables a dimensional allowance between the steering shaft and the key lock collar to be enlarged.

More specifically, the steering shaft is configured to abut on the slip ring at a plurality of portions in the axial direction. Alternatively, the steering shaft is configured to form a clearance that allows displacement of the slip ring.

The "steering lock mechanism" connotes a mechanism for restricting a rotation of the steering shaft as the necessity may arise in order to prevent a vehicle from being stolen. The "key lock collar" connotes a member that is fitted on the steering shaft and engages with the steering lock mechanism, thus restricting the rotation of the steering shaft. The "slip ring" connotes a member taking a substantially cylindrical shape and absorbing a dimensional error owing to a spring effect. To be specific, the "slip ring" connotes the member taking the substantially cylindrical shape, absorbing the dimensional error in the radial directions, through deformation in the radial directions, between a member (an internal member) disposed in contact with an inside-diametrical side and a member (an external member) disposed in contact with an outside-diameter side, and stabilizing the slip torque in relative rotations between the internal member and the external member. In the present application, the key lock collar corresponds to the external member, while the steering shaft corresponds to the internal member.

Further, according to the present invention in order to solve the problems described above, a steering apparatus is provided, which includes: a key lock collar being fitted on a steering shaft and restricted from rotating by a steering lock mechanism when performing a steering lock; and a cylindrical slip ring being interposed between the steering shaft and the key lock collar in radial directions, wherein the slip ring includes a plurality of protruded portions protruding outwardly or inwardly in the radial directions and being provided in a circumferential direction, and an axis-directional portion of the steering shaft covered by the slip ring is formed with a large-diameter portion and a small-diameter portion, thereby providing a space for the slip ring to get flexed.

The apparatus being thus configured, the clearance for the slip ring to get deformed is formed, thereby facilitating the deformation of the slip ring and enabling to reduce a change in load against the displacement of the slip ring.

Preferably, the small-diameter portion is formed spirally at least by one or more perimeters in a region on which the slip ring is fitted, and the large-diameter portion abuts on the slip ring in three positions in the axial direction.

The apparatus being thus configured, the slip ring can be incorporated from the axial direction without being caught, and workability is improved. Further, it is feasible to rotate smoothly without being caught when rotating by adopting the spiral type.

Preferably, a ratio between a surface area of the large-diameter portion on which the slip ring is fitted and a surface area of a non-contact portion of the slip ring is 1:1. The apparatus being thus configured, the slip ring becomes easier to get deformed.

Preferably, stepped portions for restricting the slip ring from moving in the axial direction are formed at both ends of the axis-directional portion.

The apparatus being thus configured, a slip characteristic can be stabilized by preventing a positional deviation of the ring portion of the slip ring.

Preferably, an end portion on the small-diameter portion side in the axial direction, of a portion, abutting on the slip ring, of the large-diameter portion is disposed in the vicinity of an axis-directional end portion of the protruded portion.

The apparatus being thus configured, the spring characteristic of the slip ring can be weakened, and a change in slip characteristic with respect to a change in diametrical dimension of the shaft can be moderated by moderating a change in characteristic of the slip torque.

Preferably, the slip ring includes a ring portion not formed with the protruded portion on the same circumference, and the steering shaft abuts on only any one of the protruded portion and the ring portion.

This contrivance further facilitates the deformation of the slip ring and enables a higher effect to be acquired. It is preferable that the ring portions are provided leastwise at end portions on the front and rear sides of the vehicle.

Further, preferably the protruded portion extends in the axial direction, and a section being cut vertically in the axial direction takes a circular arc shape.

With this contrivance, the smooth and stable rotation can be acquired without being caught. It is to be noted that the "axial direction" connotes the direction of the axial line serving as a center of the rotation of the steering shaft.

Still further, preferably two or more large-diameter portions are formed on the axis-directional portion of the steering shaft covered by the slip ring.

This contrivance provides a better stability of the slip ring and enables the stable rotations to be acquired. The three or more large-diameter portions are formed in the axial direction of the steering shaft, in which case the stable rotation can be obtained by disposing the large-diameter portions at equal intervals in the axial direction.

Yet further, preferably the large-diameter portion and the small-diameter portion are consecutively formed in the axial direction along a smoothly-curved surface.

With this contrivance, the workability is improved on the occasion of assembling, the smooth rotation can be made without being caught, and also the respective members can be prevented from deviating in the axial direction.

Each large-diameter portion has the same diametrical dimension over a certain range in the axial direction, and it is preferable that each small-diameter portion has the minimum diameter at the center in the axial direction. With this contrivance, a stable contact with the large-diameter portion can be obtained, and the clearance for allowing the displacement of the slip ring can be efficiently formed.

Moreover, preferably the large-diameter portion and the small-diameter portion are consecutively formed via a slant face inclined to the axial direction of the steering shaft.

With this contrivance, the workability is improved on the occasion of assembling, the smooth rotation can be made without being caught, and also the respective members can be prevented from deviating in the axial direction.

Preferably, the protruded portions protrude outward in the radial directions and are disposed in two positions in the axial direction with the ring portion being interposed therebetween but not being formed with the protruded portion on the same circumference, and the two small-diameter portions are formed in the axial direction.

With this contrivance, as compared with a case where the protruded portions are not disposed in the two positions in the axial direction, the slip torque can be increased. The protruded portions disposed in the two positions in the axial direction can obtain the stable rotation by having the same length in the axial direction.

Preferably, the key lock collar includes a hole portion into which a lock bar is inserted for the steering lock mechanism to restrict a rotation, and the hole portion is formed in a portion not facing the slip ring in the radial directions.

A position of the portion formed with the elongate hole is differentiated in the axial direction from a position of the portion in which the slip ring is fitted, thereby preventing roundness from declining due to the deformation of the portion in which the slip ring is fitted in the process of forming the elongate hole, and realizing the stable slip torque.

It may be sufficient that the portion engaging with the lock bar engages with the lock bar so that key lock collar does not rotate and can be also configured as an engagement portion other than the hole portion. For example, an available configuration is that an outer peripheral portion of the key lock collar is configured to form a bottomed groove portion extending in the axial direction as a substitute for the hole portion described above, and a plurality of groove portions may also be formed in the circumferential direction. However, the formation of the engagement portion is facilitated by configuring the hole portion.

The hole portion is configured as the elongate hole extending in the axial direction, whereby it is possible to provide flexibility to a positional change in the axial direction. The portion, not facing the slip ring, of the key lock collar is configured by the loose fitting with respect to the steering shaft, whereby management of accuracy of the dimension can be relaxed.

Preferably, the protruded portion protrudes outward in the radial directions, and the small-diameter portion and the protruded portion are disposed in face-to-face positions in the radial directions.

With this contrivance, the clearance for the slip ring to get deformed can be efficiently formed, thereby further facilitating the deformation of the slip ring.

Grease may be applied to a contact portion between the key lock collar and the slip ring and to a contact portion between the slip ring and the steering shaft. This contrivance can further stabilize the slip torque.

Effect of the Invention

According to the present invention, it is feasible to provide the steering apparatus configured to further stabilize the slip torque of the key lock collar and to enlarge the range of the dimensional allowance.

BRIEF DESCRIPTION OF THE DRAWINGS

FIG. 3A is a plan view; and FIG. 3B is a sectional view illustrating a section cut off along the line 3B-3B in FIG. 3A.

FIG. 4A is a plan view; and FIG. 4B is a sectional view illustrating a section cut off along the line 4B-4B in FIG. 4A.

FIG. 5B is an enlarged view of a corrugated portion.

FIG. 6A shows a side surface of the steering shaft and sections of the key lock collar and the slip ring; and FIG. 6B is an enlarged view of portions in the periphery of the slip ring in FIG. 6A.

FIG. 9A is a plan view; and FIG. 9B is a sectional view taken along the line 9B-9B in FIG. 9A.

FIG. 10A shows a side surface of the steering shaft; and FIG. 10B shows a side surface of the steering shaft and sections of the slip ring and the key lock collar.

FIG. 11A shows a side surface of the steering shaft; and FIG. 11B shows a side surface of the steering shaft and sections of the slip ring and the key lock collar.

FIG. 12A shows a side surface of the steering shaft; and FIG. 12B shows a side surface of the steering shaft and sections of the slip ring and the key lock collar.

FIG. 13A shows a side surface of the steering shaft; and FIG. 13B shows a side surface of the steering shaft and sections of the slip ring and the key lock collar.

FIG. 14A shows a side surface of the steering shaft; and FIG. 14B shows a side surface of the steering shaft and sections of the slip ring and the key lock collar.

FIG. 15A shows a side surface of the steering shaft; and FIG. 15B shows a side surface of the steering shaft and sections of the slip ring and the key lock collar.

FIG. 16A shows a plan view; and FIG. 6B shows an enlarged view of a spiral portion.

FIG. 17A shows a side surface of the steering shaft and illustrates the key lock collar and the slip ring; and FIG. 17B is an enlarged view of portions in the periphery of the slip ring in FIG. 17A.

MODE FOR CARRYING OUT THE INVENTION

[First Embodiment]

Figure 1:
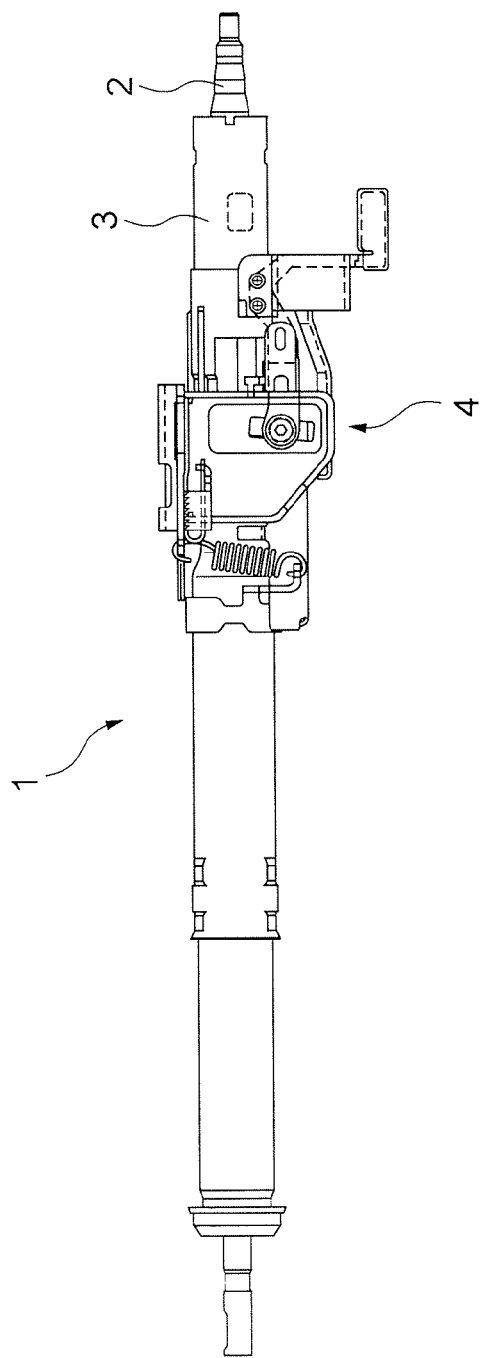
FIG. 1 is a side view illustrating a steering apparatus according to a first embodiment of the present application.

A first embodiment of the present invention will be described with reference to FIG. 1 to FIG. 6B. FIG. 1 is a side view illustrating a steering apparatus according to the first embodiment of the present application.

A steering apparatus 1 is configured to include mainly a steering shaft 2 to transfer the rotation of the steering wheel (unillustrated) fitted to a rear side (a right side as viewed in FIG. 1) of the vehicle to a front side (a left side as viewed in FIG. 1) of the vehicle, a column 3 which rotatably supports the steering shaft 2, and a position adjusting mechanism 4 which fixes a rear-side portion of the steering apparatus 1 to a vehicle body and thus enables a tilted position and a telescopic position to be adjusted.

Figure 2:
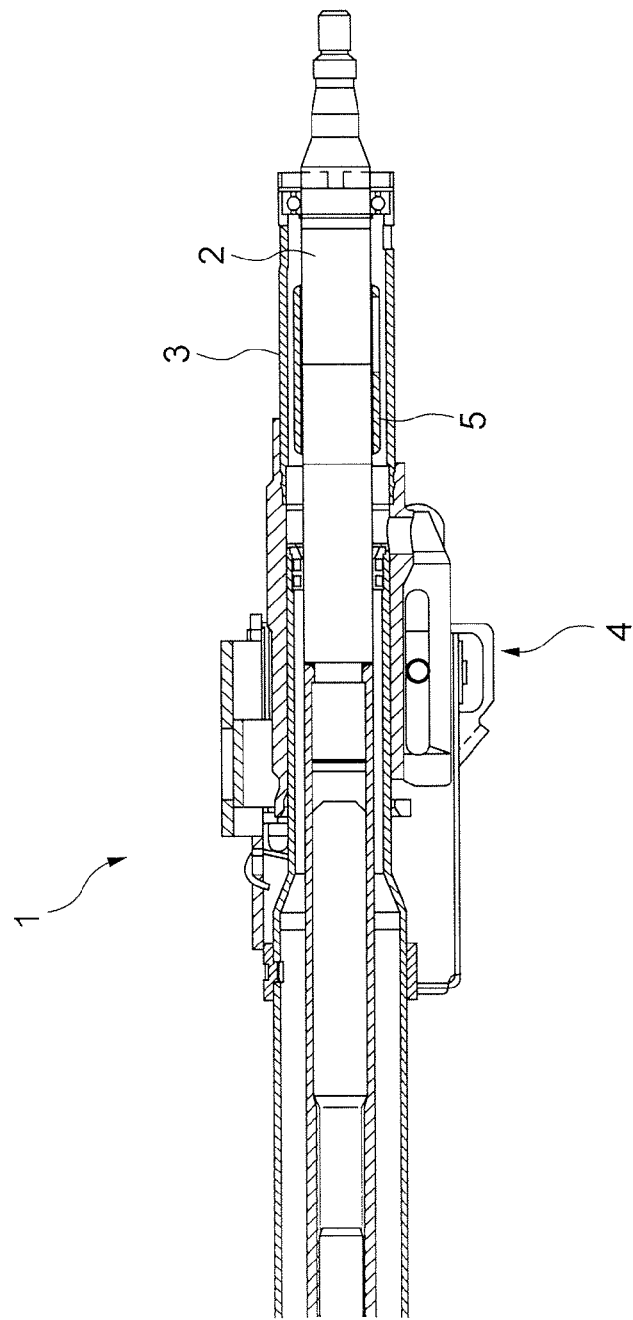
FIG. 2 is an enlarged sectional view of the steering apparatus according to the first embodiment of the present application.

FIG. 2 is an enlarged sectional view of portions in the vicinity of the position adjusting mechanism 4 of the steering apparatus 1 according to the first embodiment of the present application.

A key lock collar 5 building up the steering lock mechanism is fixedly fitted onto a portion of the steering shaft 2 on the more rear side of the vehicle than the position adjusting mechanism 4.

Figure 3A:
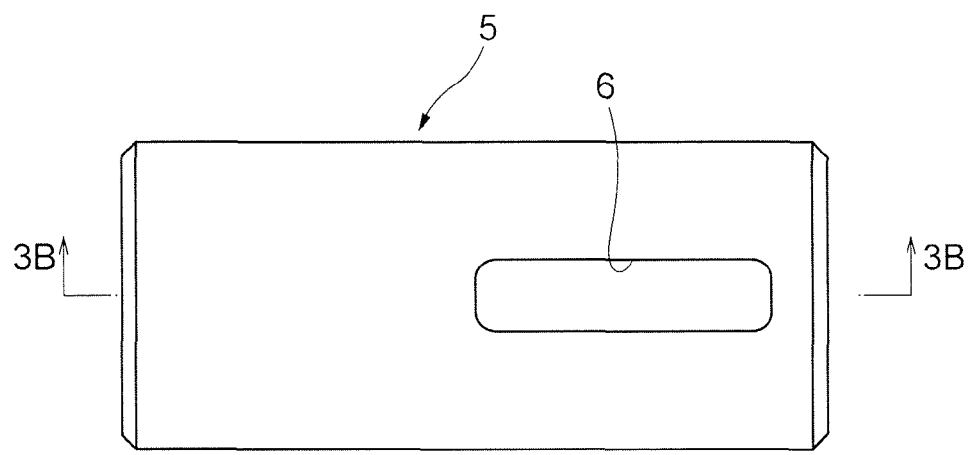
FIGS. 3A and 3B are views each depicting a key lock collar according to the first embodiment of the present application.
Figure 3B:
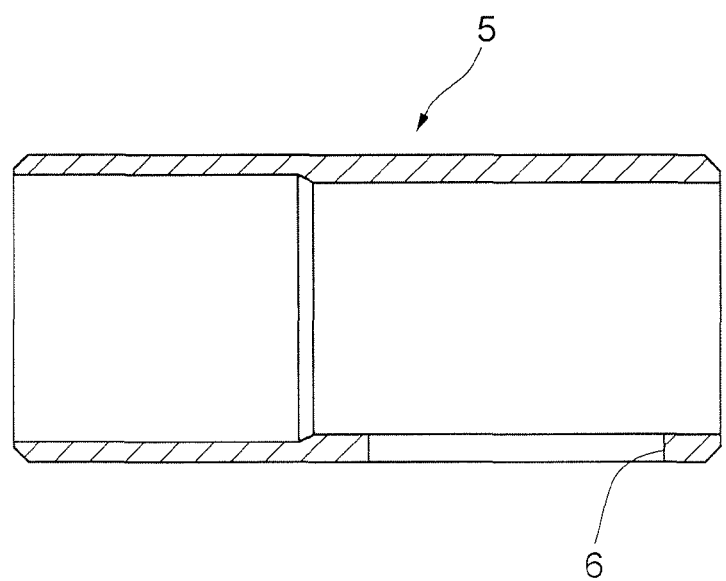

FIGS. 3A and 3B are views each depicting the key lock collar 5 according to the first embodiment of the present application. FIG. 3A is a plan view of the key lock collar 5, and FIG. 3B is a sectional view showing a cutting plane taken along the line 3B-3B in FIG. 3A.

The key lock collar 5 taking a cylindrical shape is formed with an elongate hole 6 extending toward the rear side of the vehicle in an axial direction from the vicinity of a central portion in the axial direction thereof. The elongate hole 6 is a portion receiving insertion of a lock bar protruding from an unillustrated steering lock device fitted to the column 3 and thus being engaged with the lock bar on the occasion of locking the rotation of the steering wheel. The key lock collar 5 can be formed from a material such as carbon steel for a mechanical structure.

An inner peripheral portion of the key lock collar 5 on a front side of the vehicle is enlarged in diameter, and a slip ring 7, which will be described later on, is disposed on an internal side of this diameter-enlarged portion. A position of the portion formed with the elongate hole 6 is differentiated in the axial direction from a position of the portion in which the slip ring 7 is fitted, thereby preventing roundness from decreasing due to deformation of the portion in which to fit the slip ring 7 in the process of forming the elongate hole 6 and enabling stable slip torque to be acquired.

Note that it is preferable in the present invention to dispose the elongate hole 6 on a more rear side of the vehicle than the slip ring 7, however, the elongate hole may be disposed on the front side of the vehicle, while the slip ring may also be disposed on the rear side of the vehicle.

Figure 4A:
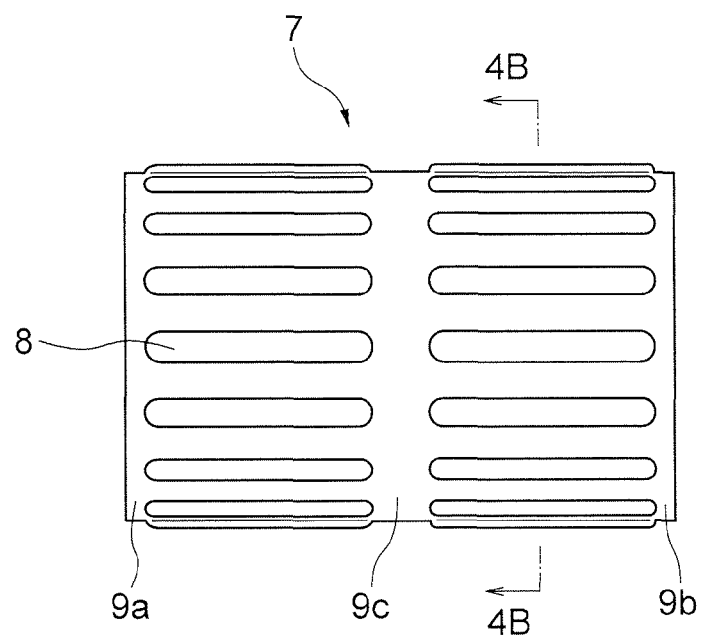
FIGS. 4A and 4B are views each depicting a slip ring according to the first embodiment of the present application.
Figure 4B:
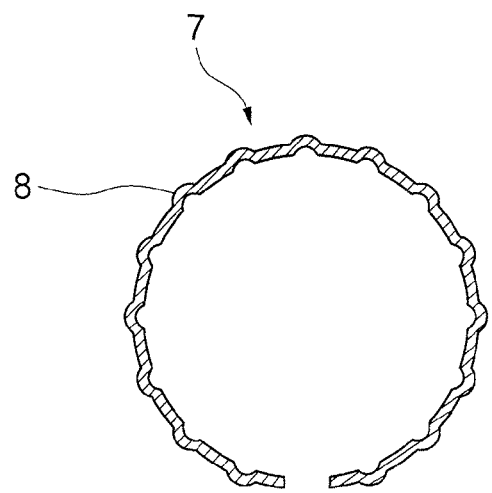

FIGS. 4A and 4B are views each illustrating the slip ring 7 according to the first embodiment of the present application. FIG. 4A is a plan view, and FIG. 4B is a sectional view showing a cutting plane taken along the line 4B-4B in FIG. 4A.

As described above, the slip ring 7 is disposed on the inner diametrical side of the key lock collar 5 and is interposed between the steering shaft 2 and the key lock collar 5. The slip ring 7 taking a substantially C-shape in section includes protruded portions 8 protruding outwardly in radial directions and extending in the axial direction, in which pluralities of protruded portions 8 are disposed in two areas on the front and rear sides of the vehicle. The protruded portions 8 are disposed in the two areas in the axial direction, whereby slip torque can be increased. The slip ring 7 can involve using slip rings being composed of spring steel etc and available on the market. A manufacturing cost can be prevented from rising by using those being available on the market.

The slip ring 7 includes ring portions 9a, 9b, 9c not having the protruded portions 8 on the same circumference at edge portions on the front and rear sides of the vehicle and middle portions therebetween.

The protruded portions 8 each takes, as illustrated in FIG. 4B, a circular arc shape in section being cut along a direction vertical to the axial direction. This configuration prevents the protruded portions 8 from being caught by a contact surface of the key lock collar 5 and enables smooth and stable rotations to be obtained.

Figure 5A:
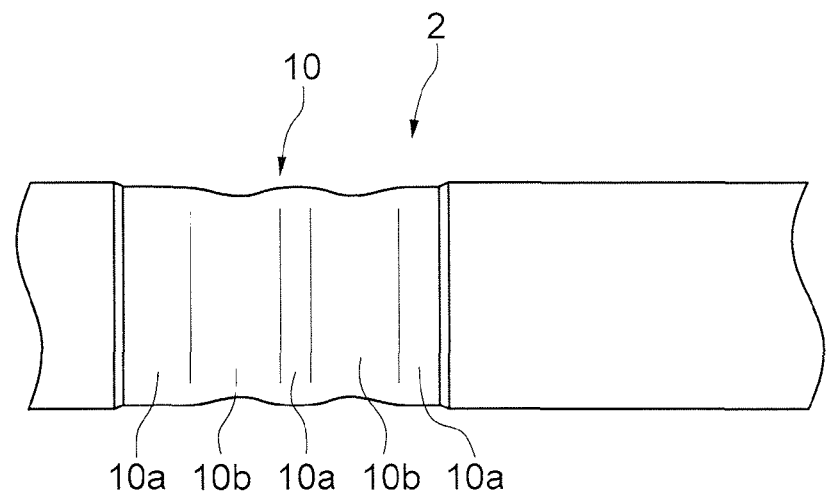
FIGS. 5A and 5B are views each illustrating a portion of a steering shaft, which is fitted to a key lock collar of the steering apparatus according to the first embodiment of the present application; FIG. SA is a plan view.
Figure 5B:
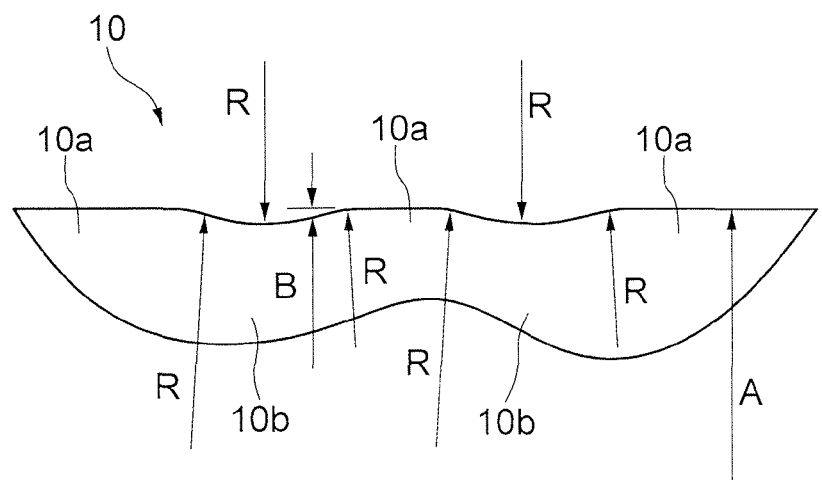

FIGS. 5A and 5B are views depicting a portion of the steering shaft 2 fitted in the key lock collar 5 of the steering apparatus 1 according to the first embodiment of the present application. FIG. 5A is a plan view, and FIG. 5B is an enlarged view of a corrugated portion 10.

The corrugated portion 10 formed with a diameter-enlarged portion and a diameter-reduced portion alternately in the axial direction, is configured on a portion of the steering shaft 2 on which the slip ring 7 is fitted. The corrugated portion 10 includes the diameter-enlarged portion and the diameter-reduced portion, which are formed repetitively along a smoothly-curved outer diametrical surface in a way that corresponds to the positions in the axial direction, and even the diameter-enlarged portion having a maximum diameter is smaller than a diameter of each of other portions of the steering shaft 2 adjacent to the corrugated portion 10. The corrugated portion 10 is formed with large-diameter portions 10a in three positions and small-diameter portions 10b in two positions.

The corrugated portion 10 includes, as illustrated in FIG. 5B, the large-diameter portions 10a having a maximum radius A that are formed in two right-and-left positions and in a middle position therebetween, in which these portions 10a each has the same diameter over a certain length in the axial direction. The small-diameter portions 10b each having the diameter smaller than the diameter of the large-diameter portion 10a are disposed in two positions between the large-diameter portions 10a and 10a and between the large-diameter portions 10a and 10a. The diameter of the small-diameter portion 10b is reduced by a dimension B, corresponding to the position in the axial direction, from the maximum radius A of the large-diameter portion 10a, and the dimension B is maximized in the middle position. The large-diameter portions 10a and the small-diameter portions 10b are smoothly continuous along the curved surface in the axial direction. The corrugated portion 10 can be easily configured by a cutting work.

Figure 6A:
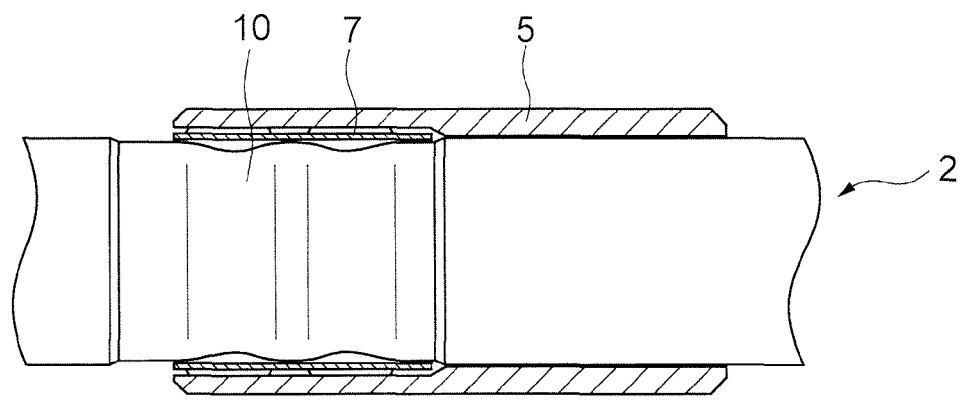
FIGS. 6A and 6B are views each depicting a steering shaft, a key lock collar and a slip ring of the steering apparatus according to the first embodiment of the present application.
Figure 6B:
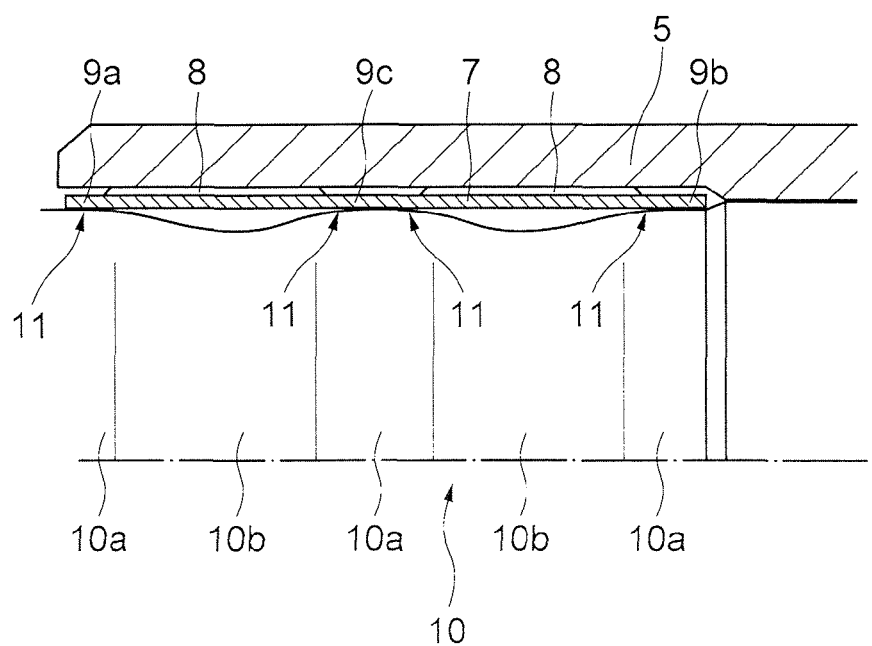

FIGS. 6A and 6B are views depicting the steering shaft 2 and the key lock collar 5 of the steering apparatus 1 according to the first embodiment of the present application. FIG. 6A shows a side surface of the steering shaft 2 and a section of the key lock collar 5. FIG. 6B is an enlarged view of the portions in the periphery of the slip ring 7 in FIG. 6A.

The fitting portion of the key lock collar 5 on the front side of the vehicle, since the corrugated portion 10 is formed on the outer peripheral surface of the steering shaft 2 as described above, whereby the steering shaft 2, are in contact with the slip ring 7, in three positions in the axial direction. The fitting portion of the key lock collar 5 on the rear side of the vehicle is attained by loose fitting.

The slip ring 7 is a plate spring formed from a plate and therefore has a comparatively high spring constant and a large variation in load against displacement (a quantity of deformation in the radial directions). The configuration that the steering shaft 2 and the slip ring 7 are in contact with each other in the three positions, can provide a space for the slip ring 7 to get flexed and can therefore moderate a flexible characteristic of the slip ring 7. As a result, the appropriate slip characteristic is obtained even by enlarging a tolerance of an outside diameter of the steering shaft 2 and a tolerance of an inside diameter of the key lock collar 5.

Further, in the first embodiment, the axis-directional portion of the steering shaft 2 abutting on the slip ring 7 is corrugated, thereby enabling the slip ring 7 to be incorporated from the axial direction without being caught and improving workability. Moreover, the steering shaft 2 is enabled to smoothly rotate without being caught by taking the corrugated configuration.

As depicted in FIG. 6B, the protruded portion 8 of the slip ring 7 and the small-diameter portion 10b of the corrugated portions 10 are provided in face-to-face positions in the radial directions. This contrivance gives a well-balanced reacting force of the slip ring 7 and enables the slip ring 7 to stably rotate without any motion in the axial direction when slipped. More specifically, a base point 11, at which the large-diameter portion 10a including a region kept abutting on the slip ring 7 reduces itself in diameter and starts being in non-contact with the slip ring 7, is disposed in the vicinity of the end portion of the protruded portion 8 in the axial direction. With this contrivance, resiliency of each of the protruded portions 8 can be utilized over a wide range in the axial direction, and hence the spring characteristic of the slip ring 7 can be weakened.

The steering shaft 2 abuts on only the ring portions 9a, 9b, 9c of the slip ring 7 at the corrugated portions 10. With this arrangement, the deformation of the slip ring 7 is facilitated, and a much higher effect can be acquired, however, in the present invention, without being limited to this arrangement, a part of the corrugated portions may abut on portions other than the ring portions.

Figure 7:
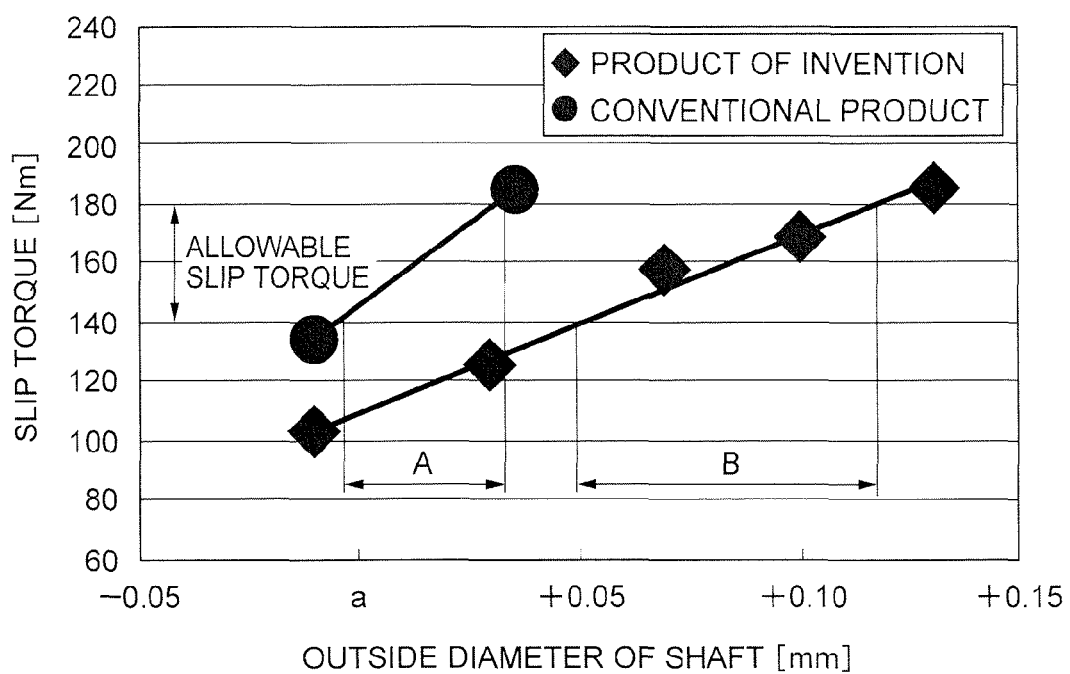
FIG. 7 is a table showing a comparison between the steering apparatus according to the first embodiment of the present application and a conventional steering apparatus in terms of a magnitude of slip torque with respect to an outside diameter of the shaft.

FIG. 7 is a table showing a comparison in magnitude of the slip torque against the outside diameter of the shaft between the steering apparatus 1 according to the first embodiment of the present application and a conventional steering apparatus.

Supposing that a range of the allowable slip torque extends from 140 Nm to 180 Nm, in the conventional steering apparatus, a range A of a steering shaft outside diameter included in this allowable slip torque range extends from a diameter slightly smaller than a reference diameter a to about +0.03 mm.

By contrast with this, in the steering apparatus 1 according to the first embodiment of the present application, a range B of the outside diameter of the steering shaft, in which the slip torque is included in the allowable range described above, extends from approximately +0.05 mm to +0.12 mm. It is recognized that the steering apparatus 1 according to the present invention has an allowable outside diameter tolerance of the steering shaft 2 that is approximately twice as large as the tolerance of the conventional apparatus.

[Second Embodiment]

Next, the steering apparatus according to a second embodiment of the present application will be described with reference to FIGS. 8, 9A and 9B. The steering apparatus according to the second embodiment is different from the steering apparatus 1 according to the first embodiment in terms of only the shape of the steering shaft and the shape of the slip ring, and other configurations are the same as those in the first embodiment. Accordingly, the description of the second embodiment will discuss only the shape of the steering shaft and the shape of the slip ring, while the explanations of other configurations will be omitted.

Figure 8:
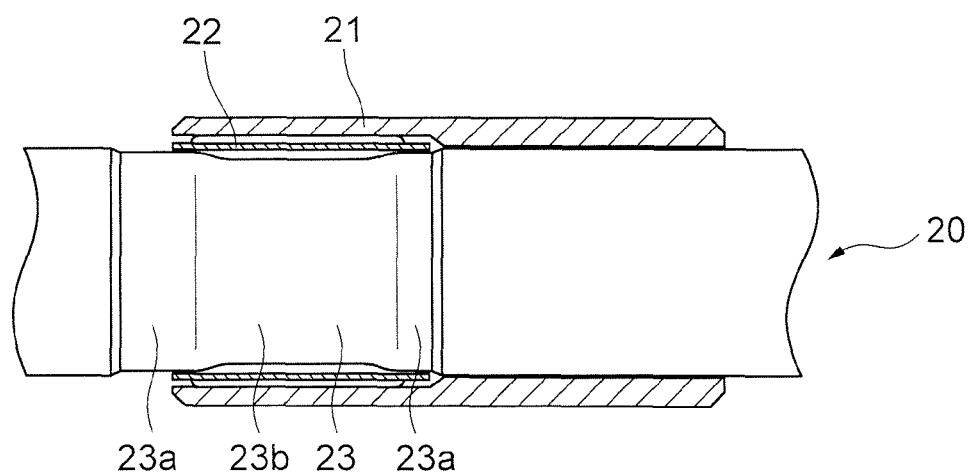
FIG. 8 is a view depicting the side surface of the steering shaft and the sections of the key lock collar and the slip ring.

FIG. 8 is a view illustrating a side surface of a steering shaft 20 and sections of a key lock collar 21 and a slip ring 22 of the steering apparatus according to the second embodiment of the present application.

In the second embodiment, an axis-directional portion of the steering shaft 20, which faces the slip ring 22 in the radial directions, is formed with a diameter-reduced portion 23 that reduces itself in diameter as compared with other adjacent portions of the steering shaft 20. The diameter-reduced portion 23 includes a pair of shoulder portions 23a on the both sides in the axial direction, which reduce themselves in diameter slightly as compared with other adjacent portions of the steering shaft 20, and also includes a bottom portion 23b extending continuously along a smoothly curved surface from the pair of shoulder portions 23a and having a certain diametrical dimension smaller than that of the shoulder portion 23a over a certain range in the axial direction between the pair of shoulder portions 23a.

Figure 9A:
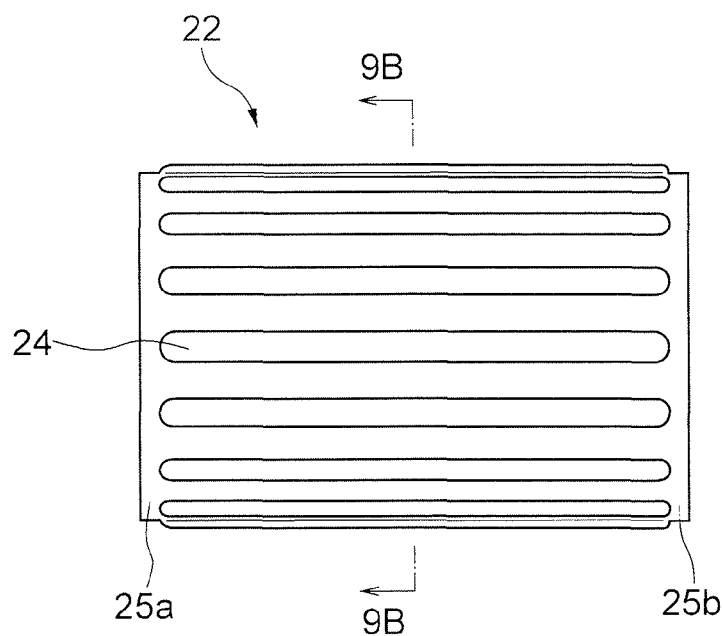
FIGS. 9A and 9B are views each depicting the slip ring of the steering apparatus according to as second embodiment of the present application.
Figure 9B:
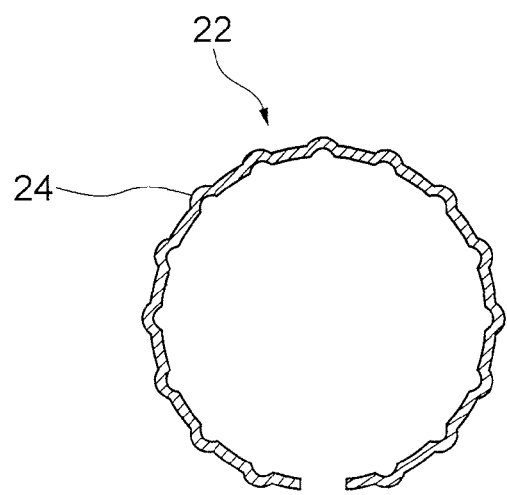

FIGS. 9A and 9B are views each illustrating the slip ring 22 of the steering apparatus according to the second embodiment of the present application. FIG. 9A is a plan view, and FIG. 9B is a sectional view taken along the line 9B-9B in FIG. 9A.

The slip ring 22 taking a substantially C-shape in section are formed with protruded portions 24 disposed in a circumferential direction, protruding outwardly in the radial directions and extending in the axial direction from the vicinity of one end of the slip ring 22 in the axial direction up to the vicinity of the other end thereof.

The slip ring 22 are provided with ring portions 25a, 25b at the end portions on the front and rear sides of the vehicle, on which are formed no protruded portions 24 on the same circumference.

According to the second embodiment, the slip torque becomes smaller than that in the first embodiment described above, and the dimensional allowances of the steering shaft 20 and the key lock collar 21 become larger than those in the first embodiment. The slip torque of the key lock collar 21 is therefore further stabilized.

[Third Embodiment]

Figure 10A:
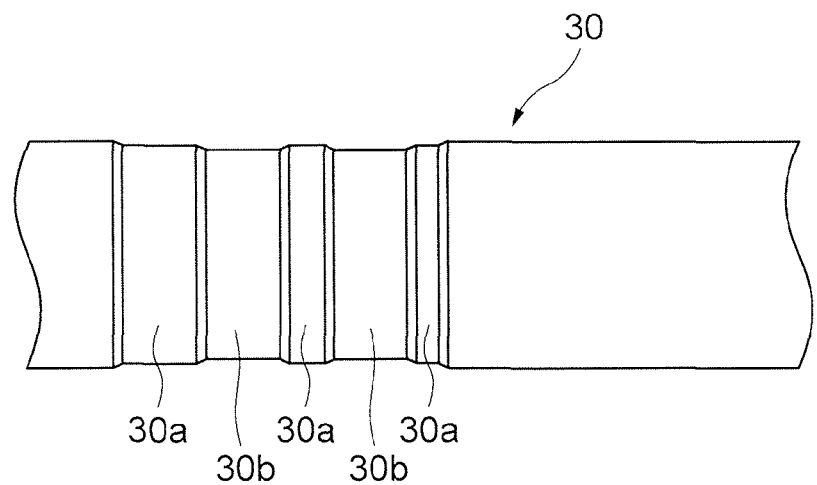
FIGS. 10A and 10B are views each depicting the steering shaft, the key lock collar and the slip ring of the steering apparatus according to a third embodiment of the present application.
Figure 10B:
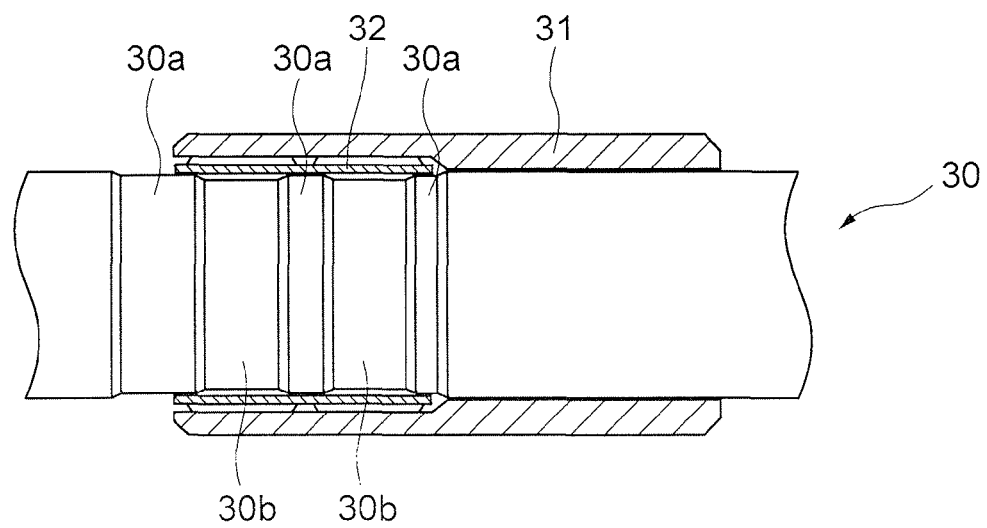

A third embodiment of the present application will be described with reference to FIGS. 10A and 10B. FIG. 10A shows a side surface of a steering shaft 30 according to the third embodiment of the present application, and FIG. 10B shows the side surface of the steering shaft 30 according to the third embodiment of the present application and also illustrates a section of a slip ring 32 and a section of a key lock collar 31 fitted on the steering shaft 30.

The steering apparatus according to the third embodiment of the present application is different from the steering apparatus according to the first embodiment in terms of only the shape of the steering shaft 30, and other configurations are the same as those in the first embodiment. Accordingly, the description of the third embodiment will discuss only the shape of the steering shaft 30, while the explanations of other configurations will be omitted.

As illustrated in FIG. 10A, a portion, on which the slip ring 32 is fitted, of the steering shaft 30 according to the third embodiment of the present application is formed with large-diameter portions 30a each having a large diameter in three positions and small-diameter portions 30b each having a small diameter in two positions between the large-diameter portions 30a. The steering shaft 30 is thus configured, and it follows that the slip ring 32 abuts on the steering shaft 30 at three portions separately in the axial direction as illustrated in FIG. 10B, whereby the slip ring 32 becomes easy to get flexed, the spring characteristic of the slip ring 32 decreases, and a change in load against the displacement can be reduced. Incidentally, it may be preferable that edge portions, on the side of the small-diameter portions 30b, of the large-diameter portions 30a are chamfered as depicted in FIGS. 10A and 10B.

[Fourth Embodiment]

Figure 11A:
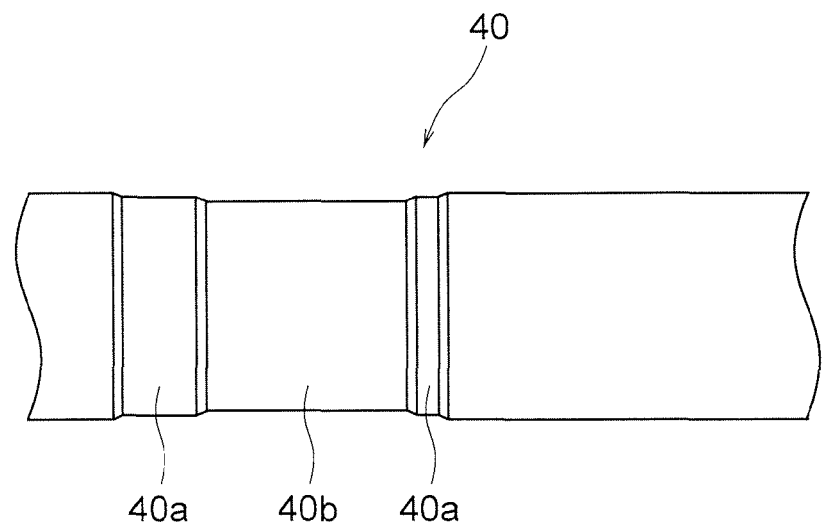
FIGS. 11A and 11B are views each depicting the steering shaft, the key lock collar and the slip ring of the steering apparatus according to a fourth embodiment of the present application.
Figure 11B:
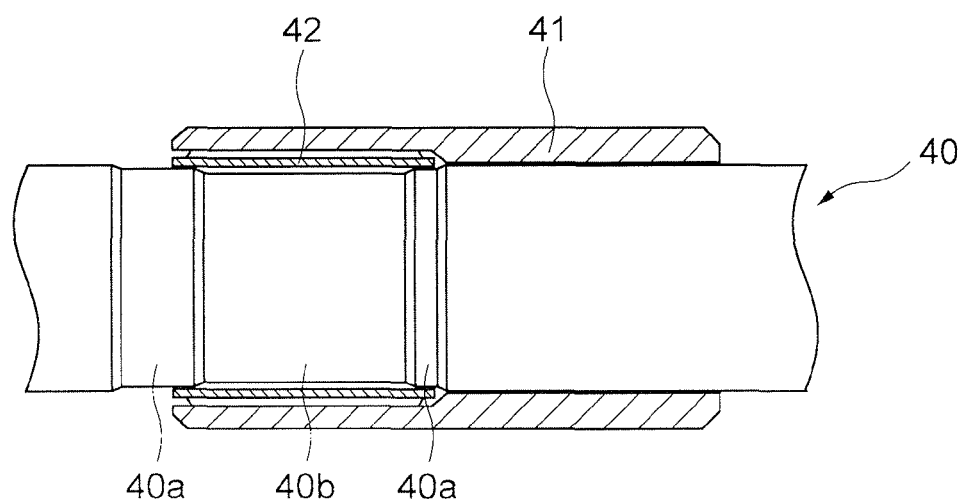

A fourth embodiment of the present application will hereinafter be described with reference to FIGS. 11A and 11B. FIG. 11A shows a side surface of a steering shaft 40 according to the fourth embodiment of the present application, and FIG. 11B shows the side surface of the steering shaft 40 according to the fourth embodiment of the present application and also illustrates a section of a slip ring 42 and a section of a key lock collar 41 fitted on the steering shaft 40.

The steering apparatus according to the fourth embodiment of the present application is different from the steering apparatus according to the first embodiment in terms of only the shape of the steering shaft 40 and the shape of the slip ring 42, and other configurations are the same as those in the first embodiment. Moreover, the slip ring 42 is the same as the slip ring 22 in the second embodiment. Accordingly, the description of the fourth embodiment will discuss only the shape of the steering shaft 40, while the explanations of other configurations will be omitted.

As illustrated in FIG. 11A, a portion, on which the slip ring 42 is fitted, of the steering shaft 40 according to the fourth embodiment is formed with large-diameter portions 40a each having a large diameter in two positions and a small-diameter portion 40b having a small diameter in one position between the large-diameter portions 40a. The steering shaft 40 is thus configured, and it follows that the slip ring 42 abuts on the steering shaft 40 at two portions separately in the axial direction as illustrated in FIG. 11B, whereby the slip ring 42 becomes easy to get flexed, the spring characteristic of the slip ring 42 decreases, and the change in load against the displacement can be reduced. Further, as compared with the third embodiment, the slip torque decreases, and the dimensional allowance of the shaft can be further increased. Incidentally, it may be preferable that edge portions, on the side of the small-diameter portion 40*b*, of the large-diameter portions 30*a* are chamfered as depicted in FIGS. 11A and 11B.

[Fifth Embodiment]

Figure 12A:
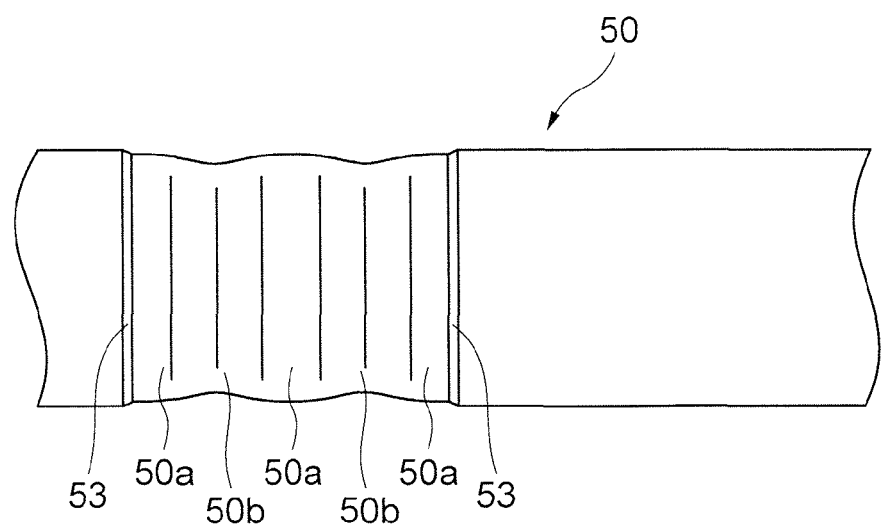
FIGS. 12A and 12B are views each depicting the steering shaft, the key lock collar and the slip ring of the steering apparatus according to a fifth embodiment of the present application.
Figure 12B:
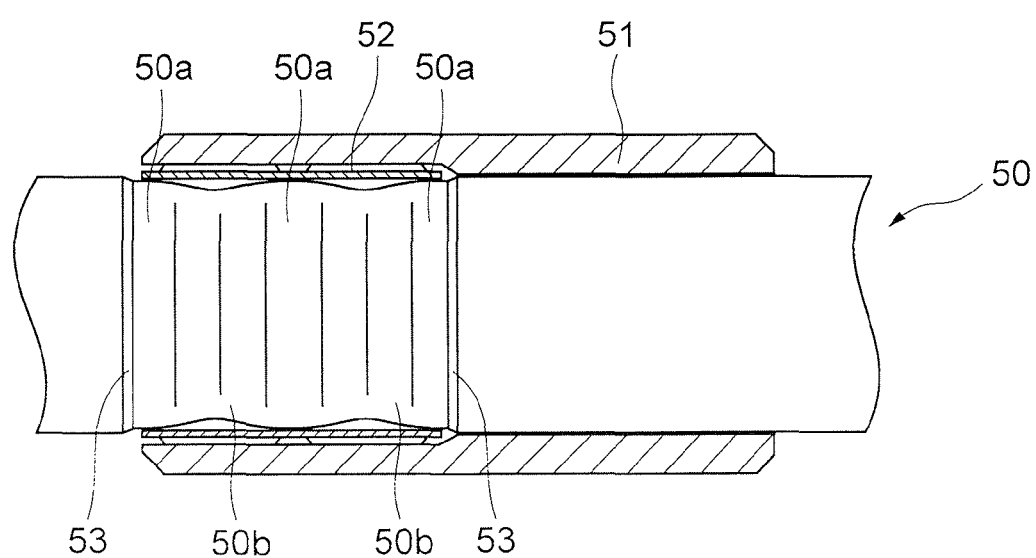

A fifth embodiment of the present application will be described with reference to FIGS. 12A and 12B. FIG. 12A shows a side surface of a steering shaft 50 according to the fifth embodiment of the present application, and FIG. 12B shows the side surface of the steering shaft 50 according to the fifth embodiment of the present application and also illustrates a section of a slip ring 52 and a section of a key lock collar 51 fitted on the steering shaft 50.

The steering apparatus according to the fifth embodiment of the present application is different from the steering apparatus according to the first embodiment in terms of only the shape of the steering shaft 50, and other configurations are the same as those in the first embodiment. Accordingly, the description of the fifth embodiment will discuss only the shape of the steering shaft 50, while the explanations of other configurations will be omitted.

As illustrated in FIG. 12A, a portion, on which the slip ring 52 is fitted, of the steering shaft 50 according to the fifth embodiment is formed with large-diameter portions 50*a* each having a large diameter in three positions and trough portions 50*b* in two positions between the large-diameter portions 50*a* with their diameters being reduced in taper from the large-diameter portions 50*a* on both sides. The steering shaft 50 is thus configured, and it follows that the slip ring 52 abuts on the steering shaft 50 at three portions separately in the axial direction as illustrated in FIG. 12B, whereby the slip ring 52 becomes easy to get flexed, the spring characteristic of the slip ring 52 decreases, and the change in load against the displacement can be reduced. Further, a portion between the large-diameter portions 50*a* is formed as the trough portion 50*b* configured to include gently slant surfaces, thereby enabling the slip ring 52 to be smoothly press-fitted in the steering shaft 50 without being caught on the occasion of press-fitting the slip ring 52 in the steering shaft 50.

The steering shaft 50 is provided with stepped portions 53 in a face-to-face relationship at both edge portions of the slip ring 52 in the axial direction. This contrivance enables the slip characteristic to be stabilized by preventing a positional deviation of the slip ring in the axial direction and keeping the contact between the large-diameter portion 50*a* and the slip ring 52 in the proper position.

[Sixth Embodiment]

Figure 13A:
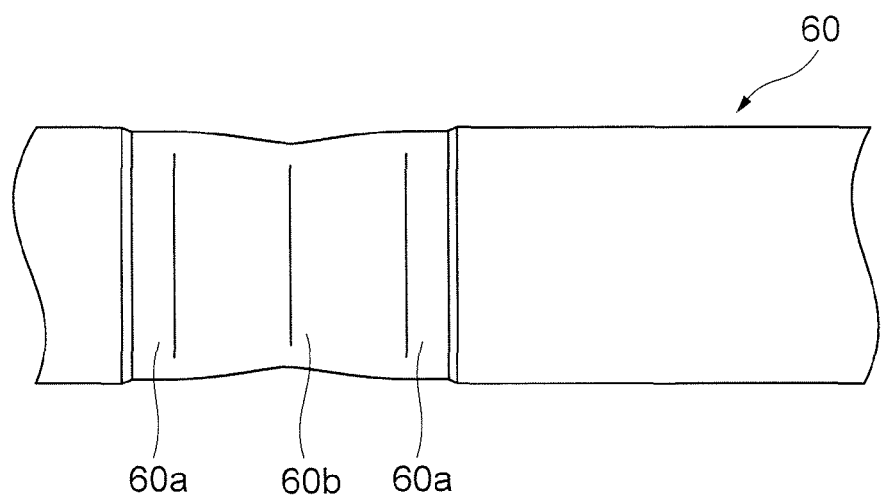
FIGS. 13A and 13B are views each depicting the steering shaft, the key lock collar and the slip ring of the steering apparatus according to a sixth embodiment of the present application.
Figure 13B:
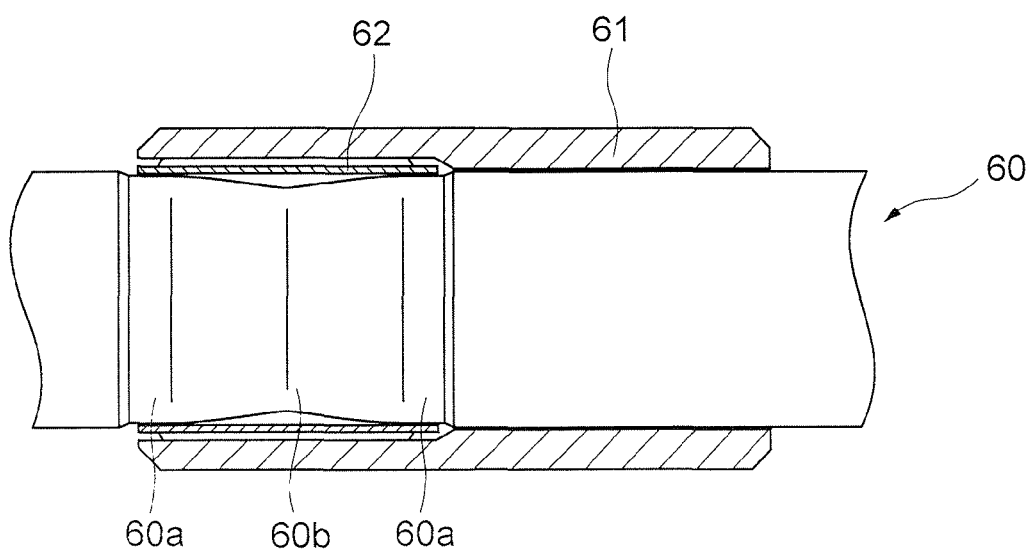

A sixth embodiment of the present application will be described with reference to FIGS. 13A and 13B. FIG. 13A shows a side surface of a steering shaft 60 according to the sixth embodiment of the present application, and FIG. 13B shows the side surface of the steering shaft 60 according to the sixth embodiment of the present application and also illustrates a section of a slip ring 62 and a section of a key lock collar 61 fitted on the steering shaft 60.

The steering apparatus according to the sixth embodiment of the present application is different from the steering apparatus according to the first embodiment in terms of only the shape of the steering shaft 60 and the shape of the slip ring 62, and other configurations are the same as those in the first embodiment. Further, the slip ring 62 is the same as the slip ring 22 in the second embodiment. Accordingly, the description of the sixth embodiment will discuss only the shape of the steering shaft 60, while the explanations of other configurations will be omitted.

As illustrated in FIG. 13A, a portion, on which the slip ring 62 is fitted, of the steering shaft 60 according to the sixth embodiment is formed with large-diameter portions 60*a* each having a large diameter in two positions and a trough portion 60*b* in one position between the large-diameter portions 60*a* with its diameter being reduced in taper from the large-diameter portions 60*a* on both sides. The steering shaft 60 is thus configured, and it follows that the slip ring 62 abuts on the steering shaft 60 at two portions separately in the axial direction as illustrated in FIG. 13B, whereby the slip ring 62 becomes easy to get flexed, the spring characteristic of the slip ring 62 decreases, and the change in load against the displacement can be reduced.

Moreover, in comparison with the fifth embodiment, the slip torque decreases, the dimensional allowance of the steering shaft 60 can be further increased, and the portion between the large-diameter portions 60*a* is formed as the trough portion 60*b* configured to include further gently slant surfaces, thereby enabling the slip ring 62 to be further smoothly press-fitted in the steering shaft 60 without being caught on the occasion of press-fitting the slip ring 62 in the steering shaft 60.

[Seventh Embodiment]

Figure 14A:
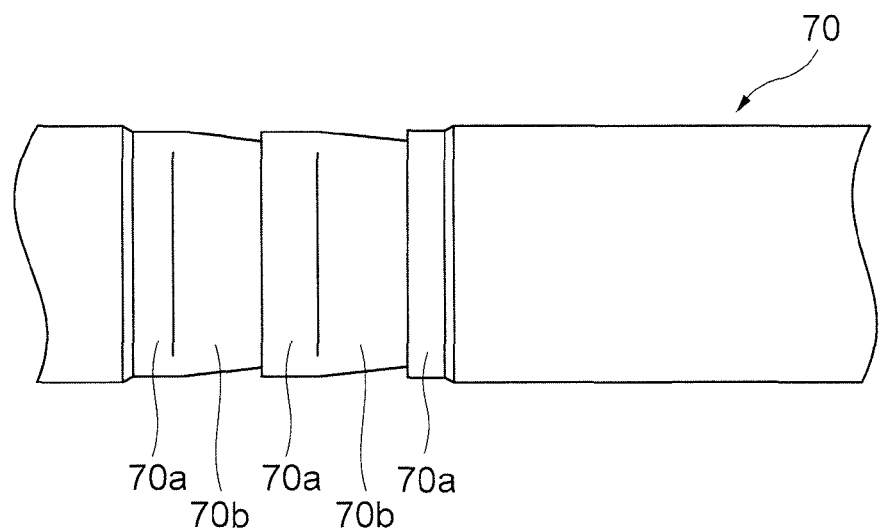
FIGS. 14A and 14B are views each depicting the steering shaft, the key lock collar and the slip ring of the steering apparatus according to a seventh embodiment of the present application.
Figure 14B:
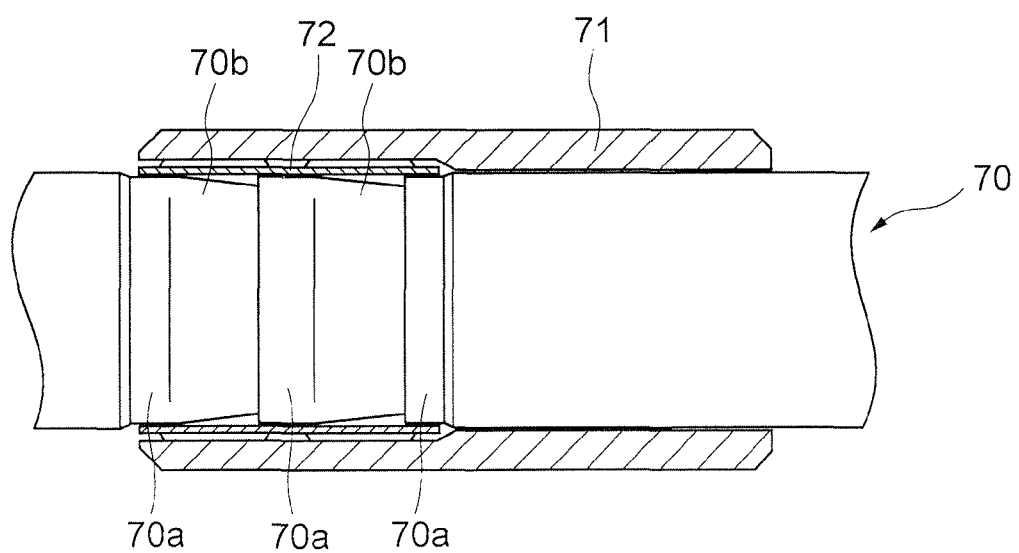

A seventh embodiment of the present application will be described with reference to FIGS. 14A and 14B. FIG. 14A shows a side surface of a steering shaft 70 according to the seventh embodiment of the present application, and FIG. 14B shows the side surface of the steering shaft 70 according to the seventh embodiment of the present application and also illustrates a section of a slip ring 72 and a section of a key lock collar 71 fitted on the steering shaft 70.

The steering apparatus according to the seventh embodiment of the present application is different from the steering apparatus according to the first embodiment in terms of only the shape of the steering shaft 70, and other configurations are the same as those in the first embodiment. Accordingly, the description of the seventh embodiment will discuss only the shape of the steering shaft 70, while other explanations will be omitted.

As illustrated in FIG. 14A, a portion, on which the slip ring 72 is fitted, of the steering shaft 70 according to the seventh embodiment is formed with large-diameter portions 70*a* each having a large diameter in three positions and tapered portions 70*b* in two positions between the large-diameter portions 70*a* with their diameters being reduced in taper from the large-diameter portion 70*a* on the front side (the left side as viewed in FIGS. 14A and 14B) of the vehicle toward the adjacent large-diameter portion 70*a* on the rear side (the right side as viewed in FIGS. 14A and 14B) of the vehicle. The steering shaft 70*a* is thus configured, and it follows that the slip ring 72 abuts on the steering shaft 70 at three portions separately in the axial direction as illustrated in FIG. 14B, whereby the slip ring 72 becomes easy to get flexed, the spring characteristic of the slip ring 72 decreases, and the change in load against the displacement can be reduced.

Moreover, in the seventh embodiment, the slip ring can be smoothly press-fitted along the gently slant surface without being caught in a way that press-fits the slip ring from the rear side (the right side as viewed in FIGS. 14A and 14B) of the vehicle. Note that in the case of press-fitting the slip ring from the front side of the vehicle (the left side as viewed in FIGS. 14A and 14B), the tapered portion 70*b* can be also configured to reduce itself in diameter as getting closer to the front side of the vehicle from the rear side of the vehicle.

[Eighth Embodiment]

Figure 15A:
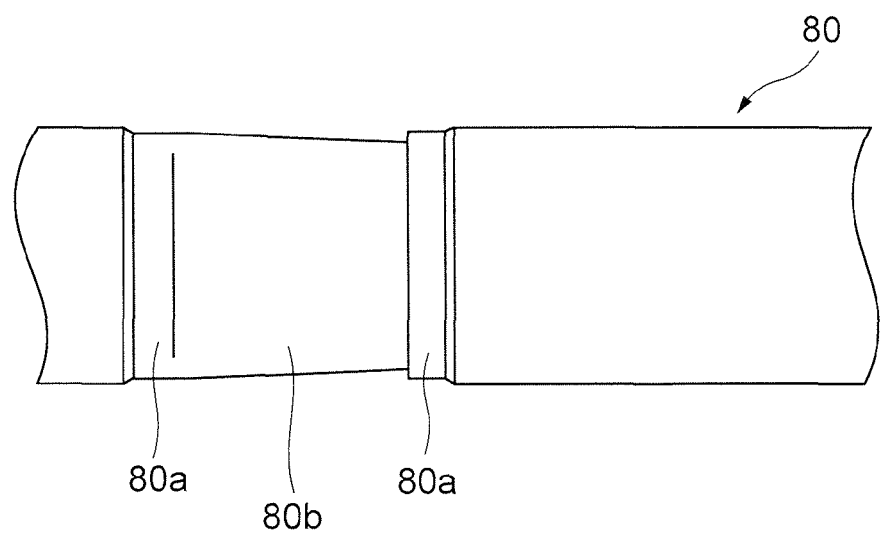
FIGS. 15A and 15B are views each depicting the steering shaft, the key lock collar and the slip ring of the steering apparatus according to an eighth embodiment of the present application.
Figure 15B:
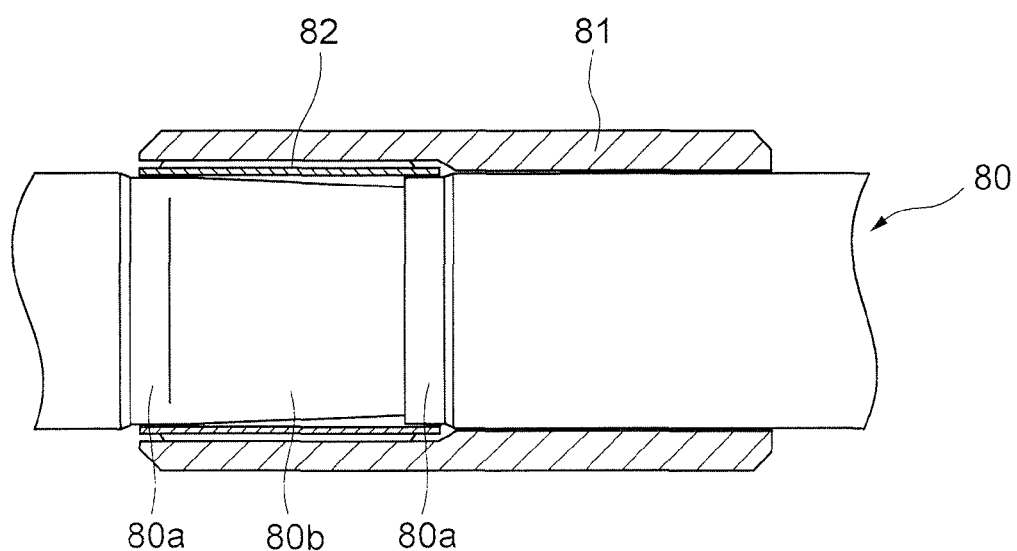

An eighth embodiment of the present application will be described with reference to FIGS. 15A and 15B. FIG. 15A shows a side surface of a steering shaft 80 according to the eighth embodiment of the present application, and FIG. 15B shows the side surface of the steering shaft 80 according to the eighth embodiment of the present application and also illustrates a section of a slip ring 82 and a section of a key lock collar 81 fitted on the steering shaft 80.

The steering apparatus according to the eighth embodiment of the present application is different from the steering apparatus according to the first embodiment in terms of only the shape of the steering shaft and the shape of the slip ring 80, and other configurations are the same as those in the first embodiment. Further, the slip ring 82 is the same as the slip ring 22 in the second embodiment. Accordingly, the description of the eighth embodiment will discuss only the shape of the steering shaft 80, while other explanations will be omitted.

As illustrated in FIG. 15A, a portion, on which the slip ring 82 is fitted, of the steering shaft 80 according to the eighth embodiment is formed with large-diameter portions 80a each having a large diameter in two positions and a tapered portion 80b between the large-diameter portions 80a with its diameter being reduced in taper from the large-diameter portion 80a on the front side (the left side as viewed in FIGS. 15A and 15B) of the vehicle toward the large-diameter portion 80a on the rear side (the right side as viewed in FIGS. 15A and 15B) of the vehicle. The steering shaft 80 is thus configured, as depicted in FIG. 15B, whereby the slip ring 82 becomes easy to get flexed, the spring characteristic of the slip ring 82 decreases, and the change in load against the displacement can be reduced.

Moreover, in comparison with the seventh embodiment described above, the slip torque decreases, the dimensional allowance of the steering shaft 80 can be further increased, and the portion between the large-diameter portions 80a is formed as the tapered portion 80b configured to include further gently slant surfaces, thereby enabling the slip ring 82 to be further smoothly press-fitted in the steering shaft 80 without being caught on the occasion of press-fitting the slip ring 82 in the steering shaft 80.

[Ninth Embodiment]

Figure 16A:
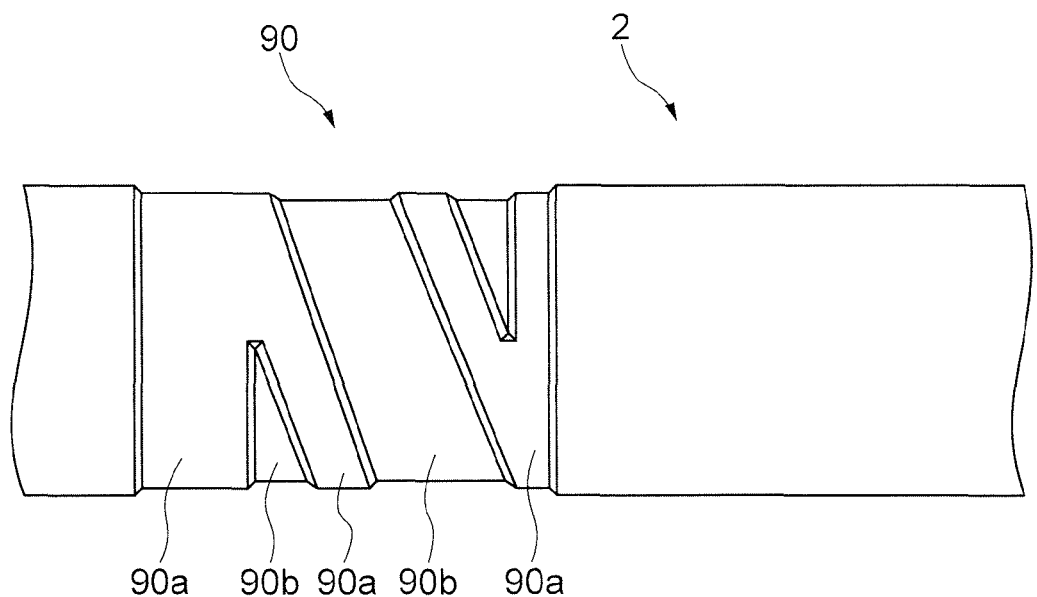
FIGS. 16A and 16B are views each depicting a portion fitted into the key lock collar, of the steering shaft of the steering apparatus according to a ninth embodiment of the present application.

A ninth embodiment of the present application will be described with reference to FIGS. 16A, 16B, 17A and 17B. FIG. 16A is a plan view, and FIG. 16B is an enlarged sectional view of a spiral portion 90.

The steering apparatus according to the ninth embodiment of the present application is different from the steering apparatus according to the first embodiment in terms of only the shape of the steering shaft 2, and other configurations are the same as those in the first embodiment. Accordingly, the description of the ninth embodiment will discuss only the shape of the steering shaft 2, while other explanations will be omitted.

A portion, on which the slip ring 7 is fitted, of the steering shaft 2 is formed as the spiral portion 90 configured to include portions having a large diameter and portions having a small diameter alternately in the axial direction. The spiral portion 90 is configured to include large-diameter portions 90a with outer diametrical surfaces being enlarged and groove portions 90b with diameters being repeatedly reduced corresponding to positions in the axial direction, in which the large-diameter portion 90a is smaller in diameter even at the most diameter-enlarged portion than other portions of the steering shaft 2 adjacent to the spiral portion 90. The spiral portion 90 includes the groove portions 90b that are formed by at least one or more perimeters in a range where the slip ring 7 is fitted on the spiral portion 90.

Figure 16B:
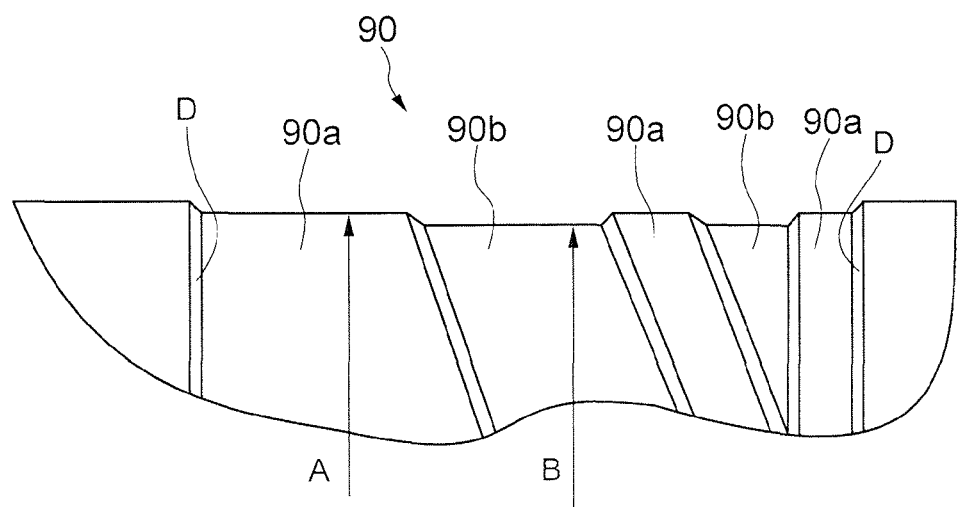

The spiral portion 90 includes, as illustrated in FIG. 16B, the large-diameter portions 90a having the maximum radius A, which are formed in two remote positions and in a middle position therebetween, in which these portions have the same diameter over a certain length in the axial direction. The groove portion 90b defined as the small-diameter portion smaller in diameter than the large-diameter portion 90a and undergoing spiral-working, is disposed between the large-diameter portions 90a. The diameter of the groove portion 90b is reduced from the maximum radius A of the large-diameter portion 90a down to a dimension B corresponding to a position in the axial direction, in which the dimension B is minimized in the middle position. Further, the large-diameter portion 90a is consecutive to the groove portion 90b. Still further, a ratio between an area of the large-diameter portion 90a on which the slip ring 7 is fitted and a surface area of a non-contact portion of the slip ring 7 due to the groove portion 90b is 1:1. Moreover, the spiral portion 90 can be easily formed by the cutting work.

The large-diameter portion 90a is, as depicted in FIG. 16B, decreased smaller than a diameter of the blank of the steering shaft 2, thereby making it possible to provide a wall portion D, at the portion on which the slip ring 7 is fitted in the axial direction, for restricting the slip ring 7 from moving in the axial direction. Note that if an allowable tolerance of the dimension of the outside diameter of the steering shaft 2 cannot satisfy predetermined slip torque of the slip ring 7, the diameter of the large-diameter portion 90a remains to be the diameter of the material of the steering shaft 2, while the wall portion D may not be provided.

Figure 17A:
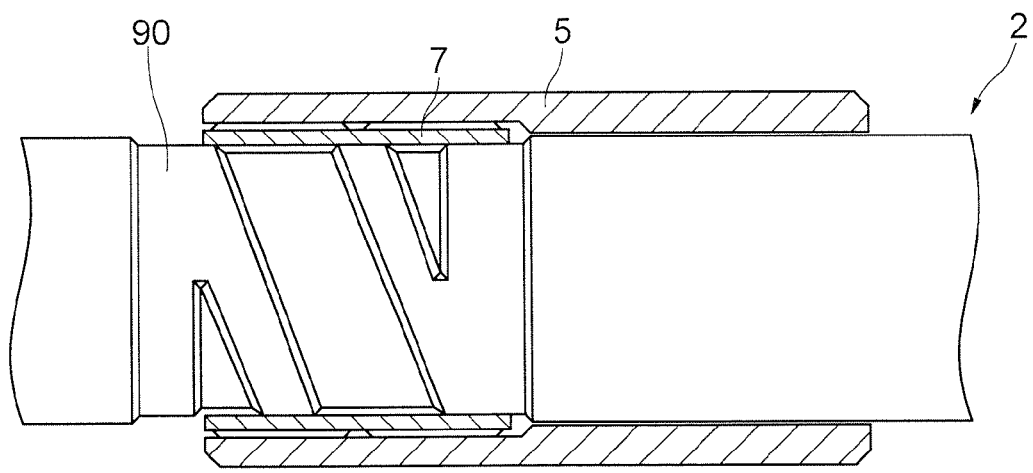
FIGS. 17A and 17B are views each depicting the steering shaft, the key lock collar and the slip ring of the steering apparatus according to the ninth embodiment of the present application.
Figure 17B:
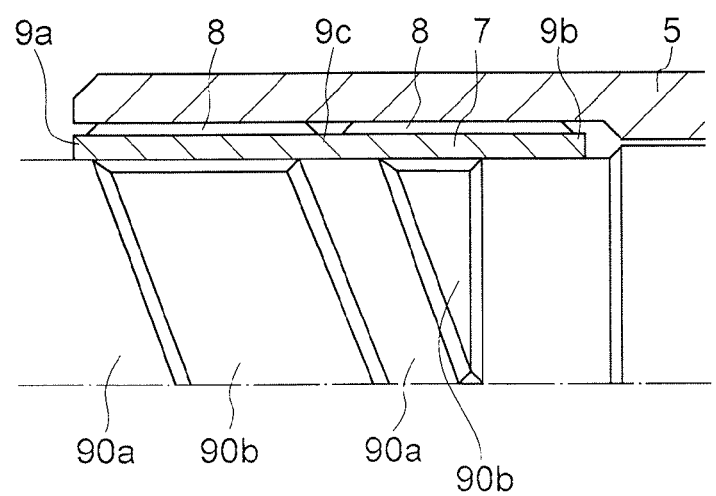

FIGS. 17A and 17B are views illustrating the steering shaft 2 and the key lock collar 5 of the steering apparatus 1 according to the ninth embodiment of the present application. FIG. 17A illustrates a side surface of the steering shaft 2 and a section of the key lock collar 5. FIG. 17B is an enlarged view of portions in the periphery of the slip ring 7 in FIG. 17A.

As described above, at the fitting portions, on the front side of the vehicle, of the key lock collar 5, the spiral portion 90 is formed on the outer peripheral surface of the steering shaft 2, whereby the steering shaft 2 and the slip ring 7 always abut on the steering shaft 2 in the three positions in the axial direction. The fitting portion of the key lock collar 5 on the rear side of the vehicle is attained by the loose fitting.

The slip ring 7 is the plate spring formed from a plate and therefore has a comparatively high spring constant and a large variation in load against displacement. The configuration that the steering shaft 2 and the slip ring 7 are brought into contact with each other in the three positions, can provide a space for the slip ring 7 to get flexed and can therefore moderate a flexible characteristic of the slip ring 7. As a result, the appropriate slip characteristic is obtained even by enlarging the tolerance of the outside diameter of the large-diameter portion 90a of the steering shaft 2 and the tolerance of the inside diameter of the key lock collar 5.

Further, as in the ninth embodiment, the axis-directional portion of the steering shaft 2 abutting on the slip ring 7 is configured in the spiral shape, thereby enabling the slip ring 7 to be incorporated from the axial direction without being caught and improving the workability. Moreover, the steering shaft 2 is enabled to smoothly rotate without being caught by taking the spiral configuration. As depicted in FIG. 17B, the groove portion 90b of the spiral portion 90 is provided along one perimeter with respect to the axis-directional length of the protruded portion 8 of the slip ring 7. This configuration provides the well-balanced reacting force of the slip ring 7 and enables the slip ring 7 to stably rotate without any motion in the axial direction when slipped.

The steering shaft 2 abuts on only the ring portions 9a, 9b, 9c of the slip ring 7 on the spiral portion 90. This contrivance facilitates the deformation of the slip ring 7, and, as a result, the appropriate slip characteristic is obtained even by enlarging the tolerance of the outside diameter of the large-diameter portion 90a and the tolerance of the inside diameter of the key lock collar 5.

In the steering apparatus according to the ninth embodiment, the slip ring 22 exemplified in the second embodiment can be also used in place of the slip ring 7.

The specific configurations have been discussed so far by way of the first through ninth embodiments for the sake of the description of the present invention, however, the present invention is not limited to these configurations, and a variety of changes and improvements can be applied thereto in carrying out the present invention.

For example, the slip ring may be, without being limited to those described above, different in terms of the number of the protrusions, the shape, the arrangement, etc.

Further, the shape of the portion, taking the face-to-face relationship with the slip ring, of the steering shaft can be changed in terms of the number of the large-diameter portions, the number of the small-diameter portions, the width in the axial direction, the diametrical dimension, etc in a way that corresponds to the shape etc of the slip ring.

The grease is applied to the contact portion between the key lock collar and the slip ring and to the contact portion between the slip ring and the steering shaft, thereby enabling the slip torque to be further stabilized.

The portion of the key lock collar, into which the lock bar is inserted, may be configured to form a bottomed groove portion extending in the axial direction along the outer peripheral portion of the key lock collar as a substitute for the elongate hole described above, and a plurality of groove portions may also be formed in the circumferential direction. Alternatively, an available configuration is that a plurality of protruded portions protruding outward in the radial direction and extending in the axial direction are disposed in the circumferential direction. In the embodiment, the portion, fitted on the slip ring, of the inner peripheral portion of the key lock collar may, though enlarging in diameter, be configured not to enlarge in diameter and may also be configured to be straight in the axial direction.

The stepped portion 53 exemplified in the fifth embodiment discussed above can be also applied to other embodiments.

As discussed above, according to the steering apparatus of the present invention, it is feasible to provide the steering apparatus configured to further stabilize the slip torque of the key lock collar and to enlarge the range of the dimensional allowance.

What is claimed is:

1. A steering apparatus comprising:
   a key lock collar being fitted on a steering shaft and restricted from rotating by a steering lock mechanism when performing a steering lock; and
   a cylindrical slip ring being interposed between the steering shaft and the key lock collar in radial directions,
   wherein the slip ring includes a plurality of protruded portions protruding outwardly or inwardly in the radial directions and being provided in a circumferential direction, and
   an axis-directional portion of the steering shaft which portion is covered by the slip ring is formed with at least two large-diameter portions and a small-diameter portion.

2. The steering apparatus according to claim 1, wherein the small-diameter portion is formed spirally at least by one or more perimeters in a region on which the slip ring is fitted, and
   the large-diameter portions abut on the slip ring in three positions in the axial direction.

3. The steering apparatus according to claim 2, wherein a ratio between a surface area of the large-diameter portions on which the slip ring is fitted and a surface area of a non-contact portion of the slip ring is 1:1.

4. The steering apparatus according to claim 1, wherein stepped portions for restricting the slip ring from moving in the axial direction are formed at both ends of the axis-directional portion.

5. The steering apparatus according to claim 1, wherein an end portion on the small-diameter portion side in the axial direction, of a portion, abutting on the slip ring, of the large-diameter portions is disposed in the vicinity of an axis-directional end portion of the protruded portions.

6. The steering apparatus according to claim 1, wherein the slip ring includes a ring portion not formed with the protruded portions on the same circumference, and
   the steering shaft abuts on only any one of the protruded portions and the ring portion.

7. The steering apparatus according to claim 1, wherein the protruded portions extend in the axial direction, and
   the protruded portions each have a circular arc shape in planes perpendicular to the axial direction.

8. The steering apparatus according to claim 1, wherein the large-diameter portions and the small-diameter portion are consecutive in the axial direction along a smoothly-curved surface.

9. The steering apparatus according to claim 1, wherein the large-diameter portions and the small-diameter portion are consecutively formed via a slant face inclined to the axial direction of the steering shaft.

10. The steering apparatus according to claim 1, wherein the protruded portions protrude outward in the radial directions and are disposed in two positions in the axial direction with a ring portion being interposed therebetween but being formed with no protruded portion on the same circumference, and two small-diameter portions are formed in the axial direction.

11. The steering apparatus according to claim 1, wherein the key lock collar includes a hole portion into which a lock bar is inserted for the steering lock mechanism to restrict a rotation, and
   the hole portion is formed in a portion not facing the slip ring in the radial directions.

12. The steering apparatus according to claim 1, wherein the protruded portions protrude outward in the radial directions, and
   the small-diameter portion and the protruded portions are disposed in a substantially same position with respect to the axial direction.

* * * * *